United States Patent
Kumar et al.

(10) Patent No.: US 10,296,517 B1
(45) Date of Patent: May 21, 2019

(54) TAKING A BACK-UP SOFTWARE AGNOSTIC CONSISTENT BACKUP DURING ASYNCHRONOUS REPLICATION

(75) Inventors: Sunil Kumar, Bangalore (IN); Robert A. Boudrie, Ashland, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 281 days.

(21) Appl. No.: 13/174,263

(22) Filed: Jun. 30, 2011

(51) Int. Cl.
*G06F 3/06* (2006.01)
*G06F 16/11* (2019.01)
*G06F 16/27* (2019.01)

(52) U.S. Cl.
CPC ............ *G06F 16/273* (2019.01); *G06F 3/065* (2013.01); *G06F 16/11* (2019.01)

(58) Field of Classification Search
CPC ......... G06F 17/30088; G06F 17/30578; G06F 17/30581; G06F 11/1451; G06F 16/11; G06F 16/27; G06F 16/273; G06F 3/065
USPC ....... 707/613, 615, 616, 649, 655, 658, 609, 707/610, 640, 644, 648, 999.204
See application file for complete search history.

(56) References Cited

U.S. PATENT DOCUMENTS

| | | | |
|---|---|---|---|
| 6,397,242 B1 * | 5/2002 | Devine et al. .................... 718/1 |
| 6,757,821 B1 * | 6/2004 | Akiyama et al. ............. 713/100 |
| 7,401,251 B1 * | 7/2008 | Haynes et al. ................ 714/5.11 |
| 7,549,027 B1 * | 6/2009 | McAndrews et al. ........ 711/161 |
| 7,552,279 B1 * | 6/2009 | Gandler ......................... 711/114 |
| 7,765,187 B2 * | 7/2010 | Bergant ............... G06F 11/1435 707/614 |
| 9,069,479 B1 * | 6/2015 | Natanzon ............... G06F 3/0605 |
| 9,471,579 B1 * | 10/2016 | Natanzon ............ G06F 11/2064 |
| 10,042,579 B1 * | 8/2018 | Natanzon ................. G06F 3/065 |
| 2006/0143412 A1 * | 6/2006 | Armangau ............ G06F 3/0611 711/162 |
| 2007/0136389 A1 * | 6/2007 | Bergant et al. ................ 707/201 |
| 2007/0260830 A1 * | 11/2007 | Faibish ................... G06F 3/061 711/162 |
| 2010/0030826 A1 * | 2/2010 | Kohno ................. G06F 11/1662 707/E17.005 |

FOREIGN PATENT DOCUMENTS

WO WO 2010002408 A1 * 1/2010

* cited by examiner

*Primary Examiner* — James E Richardson
(74) *Attorney, Agent, or Firm* — Daly, Crowley, Mofford & Durkee, LLP

(57) ABSTRACT

A system, program product, and computer implemented method for providing a back-up application agnostic back-up during asynchronous data replication, the method comprising determining if a communicative coupling, coupled to a first site, is set to an automatic mode, based on a positive determination of an automatic mode, setting the communicative coupling to a manual transfer mode, pausing an application on the first site in an application consistent state and creating a snapshot of a portion of a first storage medium on the first site accessed by the application.

18 Claims, 8 Drawing Sheets

Identify LUNS 510

Check VSS availability 515

Check link mode 520

Set link mode 525

Quiesce application 530

Use VSS tool 535

Create COFW of LUNs 540

Start manual update 545

End VSS update 550

Un quiesce application 555

Create snap 560

Set link mode 565

TAKING A BACK-UP SOFTWARE AGNOSTIC CONSISTENT BACKUP DURING ASYNCHRONOUS REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A system, program product, and computer implemented method for providing a back-up application agnostic back-up during asynchronous data replication, the method comprising determining if a communicative coupling, coupled to a first site, is set to an automatic mode, based on a positive determination of an automatic mode, setting the communicative coupling to a manual transfer mode, pausing an application on the first site in an application consistent state and creating a snapshot of a portion of a first storage medium on the first site accessed by the application.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
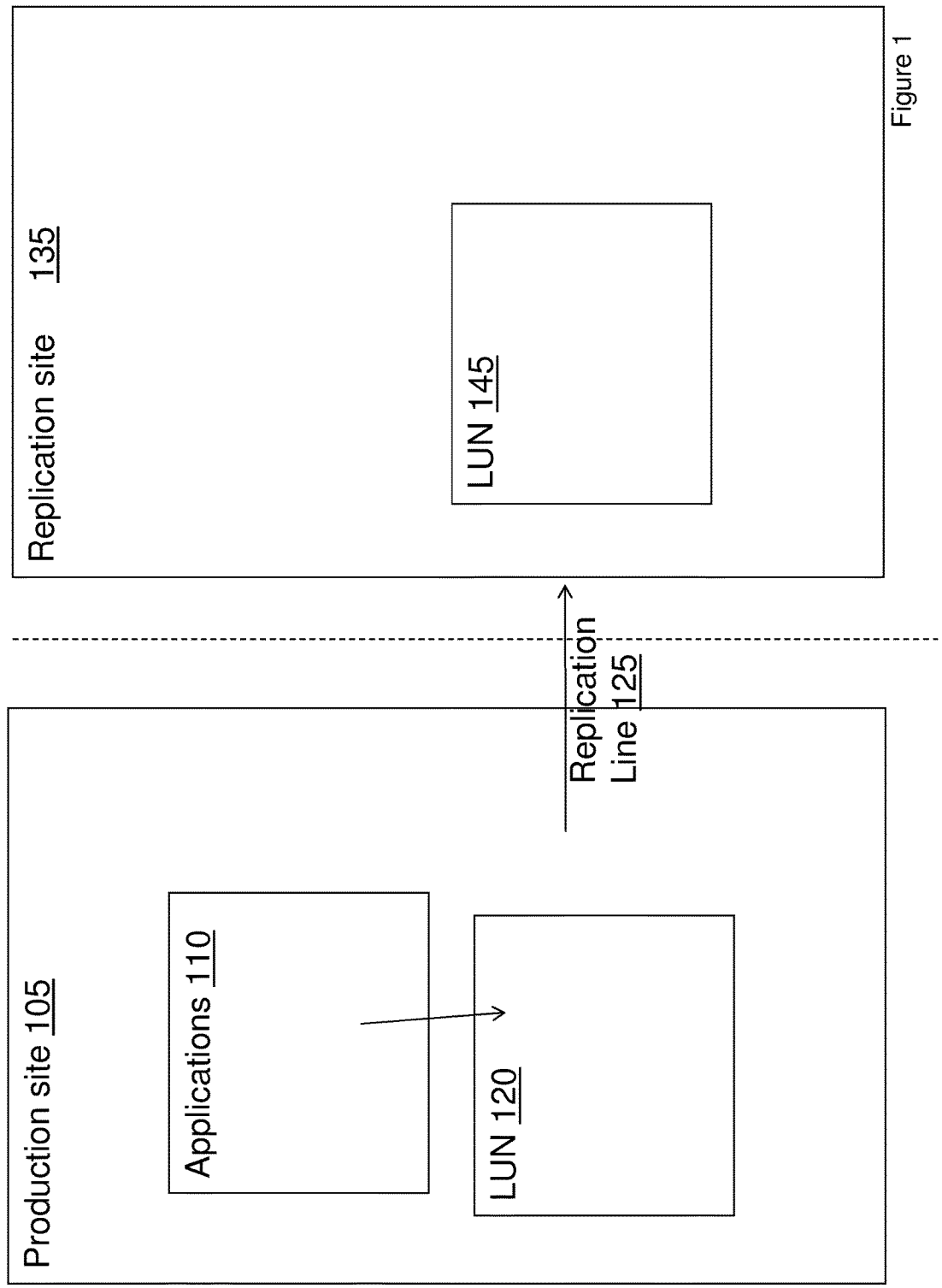
FIG. 1 is a simplified illustration of a production site with a LUN and a replication site with a LUN, in accordance with an embodiment of the present disclosure.

In an embodiment, the current disclosure may enable taking an application consistent snapshot of an application on Disaster Recovery (DR) site regardless of the back-up application used. In certain embodiments, the snapshot may be taken on a storage system during asynchronous replication. In some embodiments, application snapshot technology may be leveraged. In further embodiments, the application back-up may occur regardless of the type of replication site or the replication software used.

In a particular embodiment, the line or communicative coupling transferring data between a production and replication site may be set to only transfer data manually. In some embodiments, the communicative coupling or transfer line may be a network connection. In other embodiments, the coupling may be a fiber connection. In still further embodiments, the coupling may be any connection which would enable a replication site and a production site to communicate. In at least some embodiments, the application to be backed-up may be frozen. In some embodiments, the image corresponding to the LUN or LUNs on which the application to be backed-up may be frozen. In certain embodiments, the image may be copied. In some embodiments, the replication may occur from the copied image. In further embodiments, the system may manually trigger a back-up from the copy of the image. In certain embodiments, the differences between the copied image may be transferred to the replication image, which may ensure that the replication image is consistent. In further embodiments, a snapshot of the replication image may be taken.

Generally, during data replication, data is transferred from a primary site to a replication site. Conventionally, there may be synchronous replication, which may ensure that the replication site has the same data as the primary site, and asynchronous replication, which may not require the data be transferred to the replication site immediately. Usually in asynchronous replication, when data has been written to the primary storage site, new writes to that site can be accepted without having to wait for the secondary (replication) site to also finish its writes. Typically, asynchronous replication may have the disadvantage of incurring data loss should the primary site fail before the data has been written to the secondary site.

Conventionally, in asynchronous replication, if the application is not paused, the application may not be in a consistent state on the production and replication site. Generally, this may be because IO may be coming into the application and this may not have been yet transferred to the replication site. Thus, typically the application needs to be paused in order to back-up the application in asynchronous replication. Specifically, the image on the production site should be the same as the image on the replication site when the snapshot of the replication site is taken. As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

Conventionally with respect to a database application or other applications needing consistency, such as Microsoft exchange running on Virtual Machine, it can be hard to successfully replicate the application using asynchronous replication. Generally, this is because of the conventional techniques used to take an application consistent back-up of a virtual machine. Usually, a backup would use a tool such as the Microsoft VSS framework to pause the application. Typically, such tools give a limited period of time, for example 10 seconds, to commit the application consistent snapshot. Conventional techniques require that the backup application has to make sure that DR site and primary site sees the same data (byte by byte) in this ten second window. Usually, this limited time window can provide challenges as an asynchronous replication DR site is normally behind the production site in terms of the application data it received.

Conventional techniques may enable a specific application, such EMC Mirrorview, to perform asynchronous replication. Generally, EMC's Mirrorview creates snapshots of one or more LUNs on a production site and may automatically perform replication from the snapshot to the replication site. Conventionally, EMC's Mirrorview performs replication on an array based production site. Traditionally, the production site may be instructed to identify LUNs which correspond to an application. Usually, the replication link mode may be set to automatic or manual. Using conventional techniques, the application may be quiesced or paused. Generally, Mirrorview may take a snapshot and replicate from that snapshot to the replication site to create an application consistent snapshot on the replication site. However, using conventional techniques, there is not a back-up software agnostic way to create an application consistent snapshot on a replication site.

Virtual machine technology, including the ESX server, is described in U.S. Pat. No. 6,397,242 to Devine et. al, issued May 28, 2002 and assigned to VMware, a majority owned subsidiary of EMC Corporation, the assignee of the present invention. This '242 patent is hereby incorporated in its entirety by this reference. The virtual machine technology interacting with a data storage environment is described in U.S. Pat. No. 7,552,279 to Mark Gandler issued Jun. 23, 2009 and assigned to EMC Corporation, the assignee of the present invention. This '279 patent is hereby incorporated in its entirety by this reference. Replication technology is described in U.S. Pat. No. 7,549,027 to McAndrews et. al, issued Jun. 16, 2009 and assigned of EMC Corporation, the assignee of the present invention and is hereby incorporated by reference in its entirety. Replication technology is described in U.S. Pat. No. 7,401,251 to Haynes et. al, issued Jul. 15, 2008 and assigned of EMC Corporation, the assignee of the present invention and is hereby incorporated by reference in its entirety.

Refer now to the example embodiment of FIG. 1. In FIG. 1, production site 105 has LUN 120. Replication site 135 has LUN 145. Production site 105 has applications 105. LUN 145 is a replication of LUN 120 and IO being written to LUN 120 is being replicated to LUN 145 in an asynchronous manner via replication line 125. In certain embodiments, replication line 125 may be any communication manner that may couple the production and replication site, such as but not limited to a direct line, and Ethernet connection, a fiber connection or the like. In the embodiment of FIG. 1, the replication is currently in automatic mode and changes to LUN 120 may be transferred to LUN 145 asynchronously.

Figure 2:
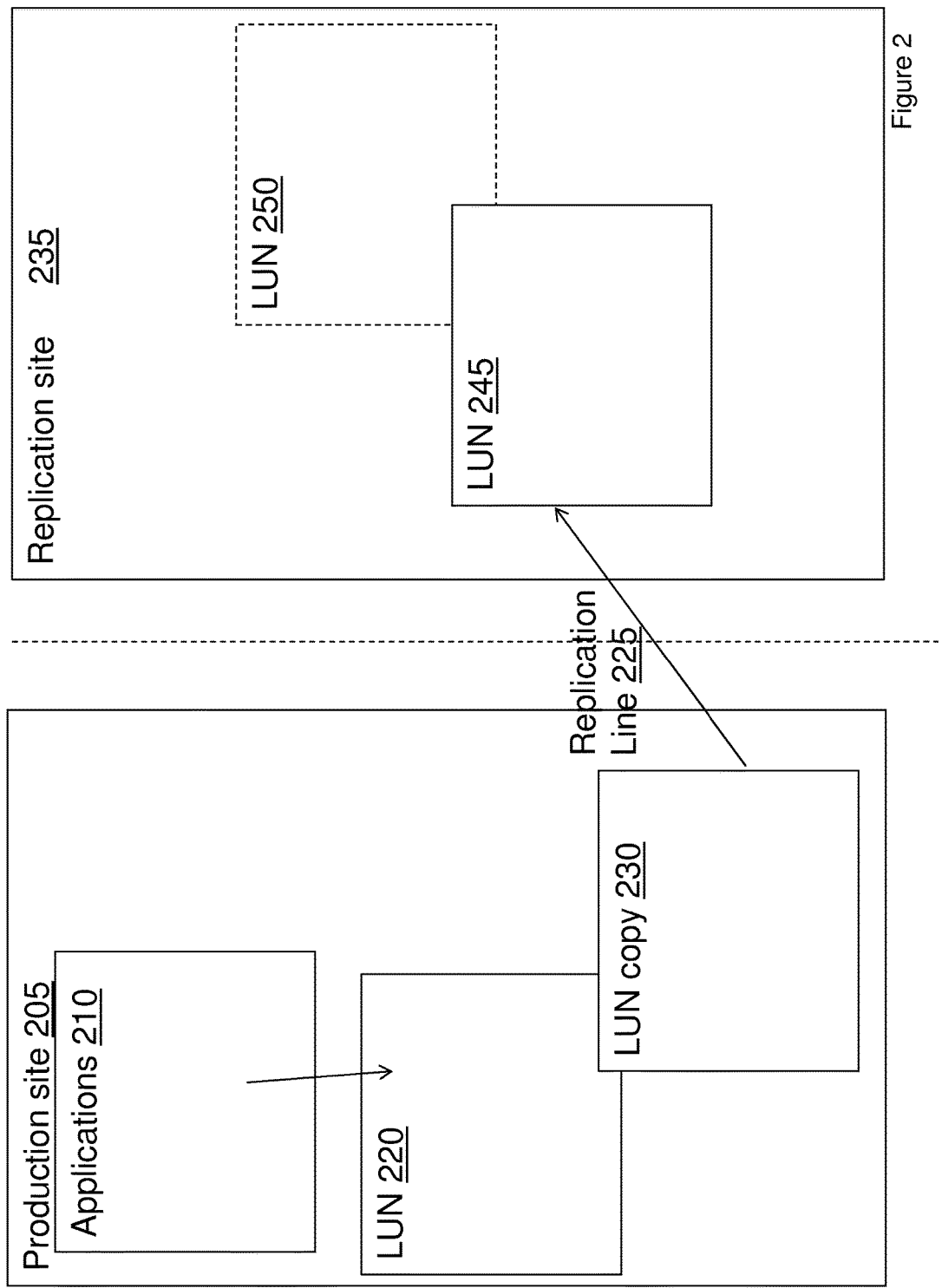
FIG. 2 is a simplified illustration of a production site with a LUN and a LUN copy, and and a replication site with a LUN, in accordance with an embodiment of the present disclosure.
Figure 3:
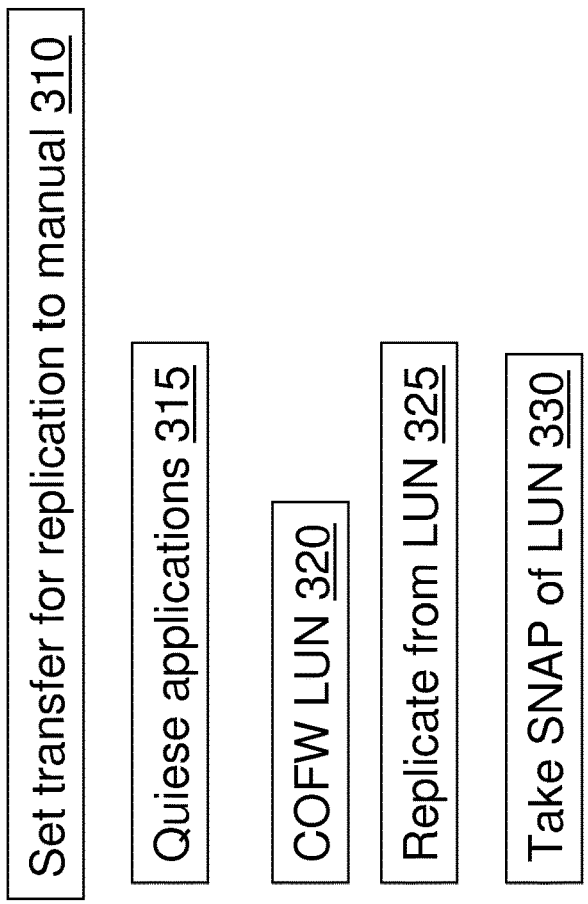
FIG. 3 is a simplified method for creating an application consistent snapshot during asynchronous replication, in accordance with an embodiment of the present disclosure.

Refer now to the example embodiments of FIGS. 2 and 3. Replication line 245 is set to manual replication (step 310). Applications 205 are quiesced (step 315). A copy of LUN 220, LUN copy 230, is made (320). Replication to LUN 245 is resumed using LUN copy 230 (step 325). In this embodiment, the changes between LUN copy 230 and LUN 245 are transferred from LUN copy 230 to LUN 245. Given that the changes between LUN copy 230 and LUN 245 have been transferred to LUN 245, LUN 245 may be in an application consistent state. Snapshot 250 of LUN 245 may be taken (step 230). Snapshot 250 may represent an application consistent replicated image of LUN 220 at the point in time that applications 210 were quiesced and LUN 220 was in a consistent state.

Figure 4:
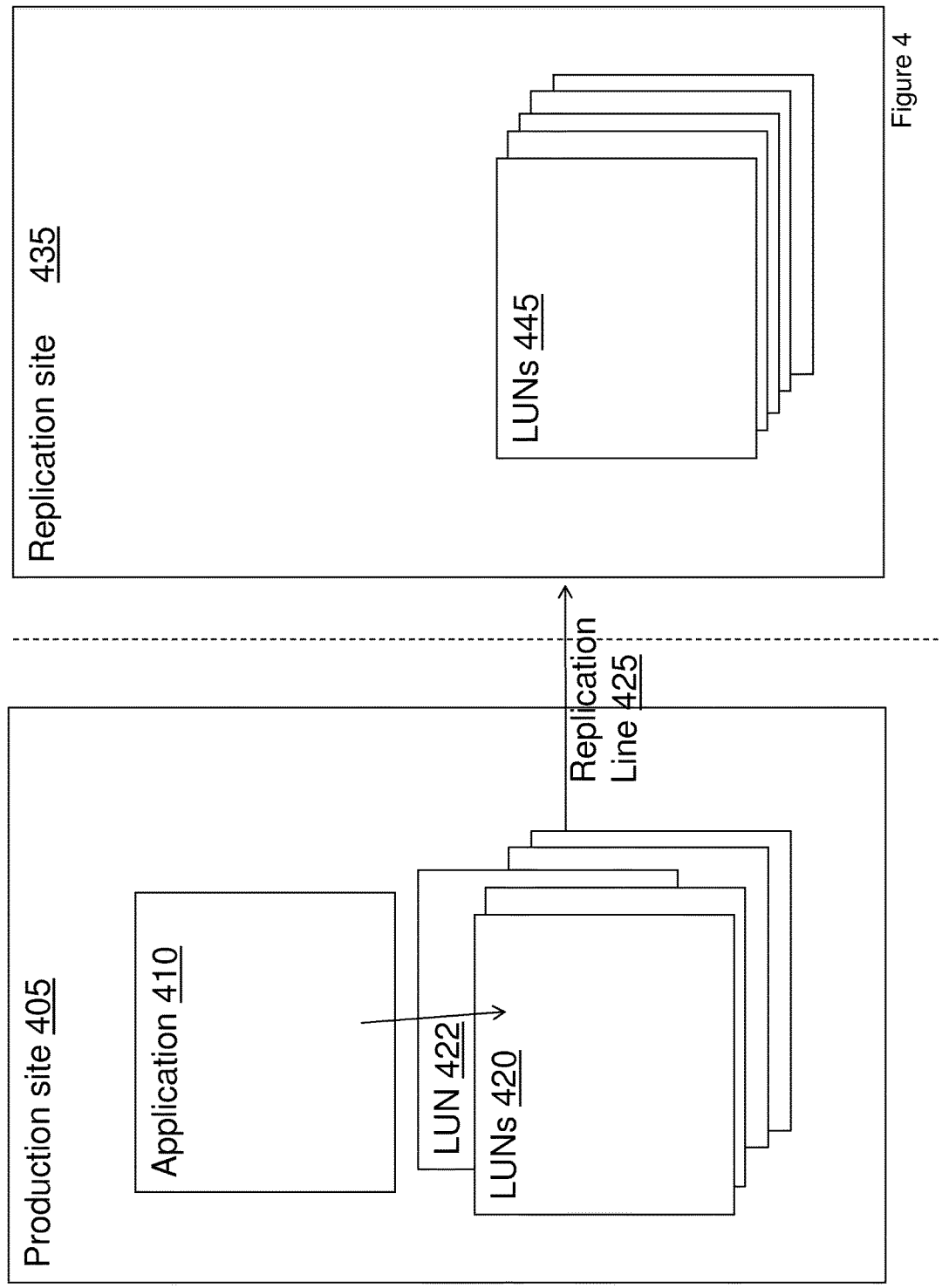
FIG. 4 is a simplified illustration of a production site with multiple LUNs and a replication site with multiple LUNs, in accordance with an embodiment of the present disclosure.
Figure 5:
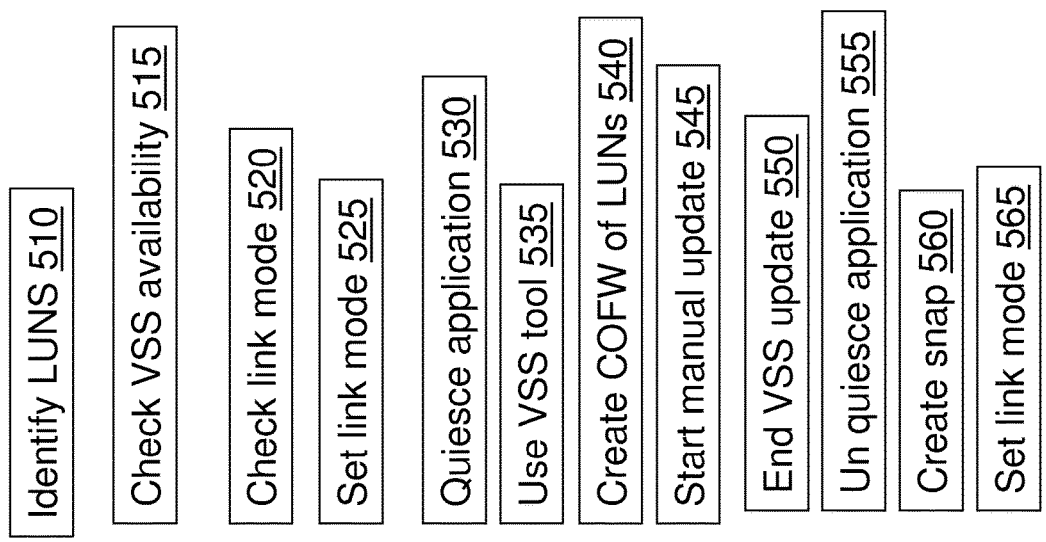
FIG. 5 is an alternative simplified method for creating an application consistent snapshot during asynchronous replication, in accordance with an embodiment of the present disclosure.

Refer now to the example embodiments of FIGS. 4 and 5. On production site 405, application 410 may access data stored on one or more of LUNs 420. The LUN or LUNs of LUNs 420 used with application 410 are identified, which in this case are LUNs 420 and 422 (step 510). It is verified that application 410 responds to a pause command, such as a VSS requester (step 515). A connectivity check is performed on replication link 425 (step 520). In some embodiments, the link may be checked by checking the replication link state. If the link status is not in manual, Replication link 425 is set to manual replication (set 525). Application 410 is quiesced or frozen (step 530). A pause tool, such as the VSS tool is used to get a consistent application state (step 535).

Figure 6:
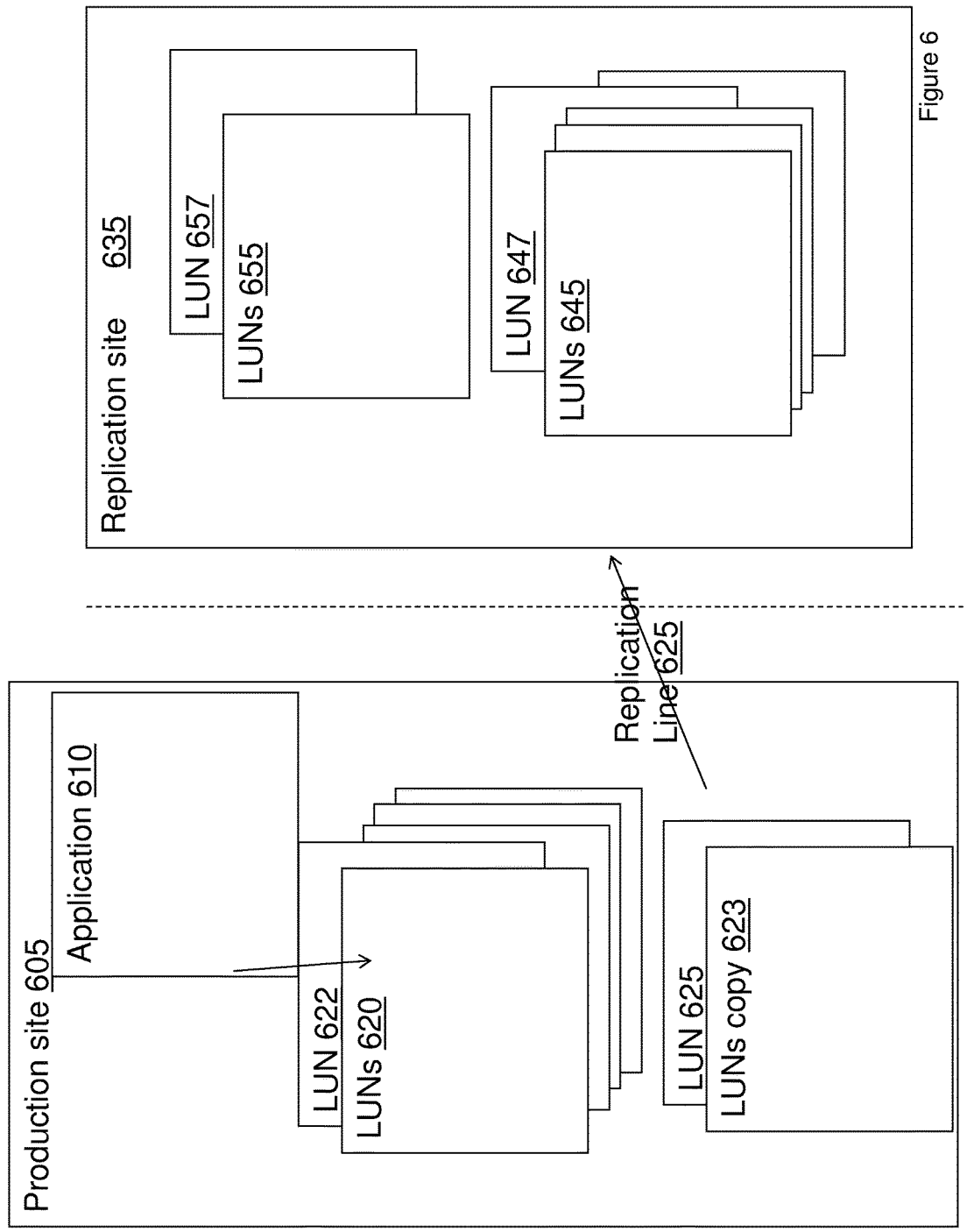
FIG. 6 is a simplified illustration of a production site with multiple LUNs, LUN copies, and a replication site with multiple LUN and LUN copies, in accordance with an embodiment of the present disclosure.

Refer now to the example embodiments of FIGS. 5 and 6. LUN copies 623, 625 of the local point-in-time snapshot (COFW) of all the identified LUNs for application 610 are created. A manual update of the replicated image of LUN 645 is started using LUN copies 623,625 (step 545). The application pause, such as the VSS commit, is ended (step 550). Application 510 is un-quiesced (step 555). Given that the changes between LUN copies 623, 625 and LUNs 645, 637 have been transferred to LUN 645, 647, snapshots 655, 657 of LUNs 645, 647 are taken, which are an application consistent snapshot of LUNs 620, 622, when the applications were quiesced (step 560). Replication link mode for replication link 425 is reset to its original state, which may be automatic replication. (step 565).

Figure 7:
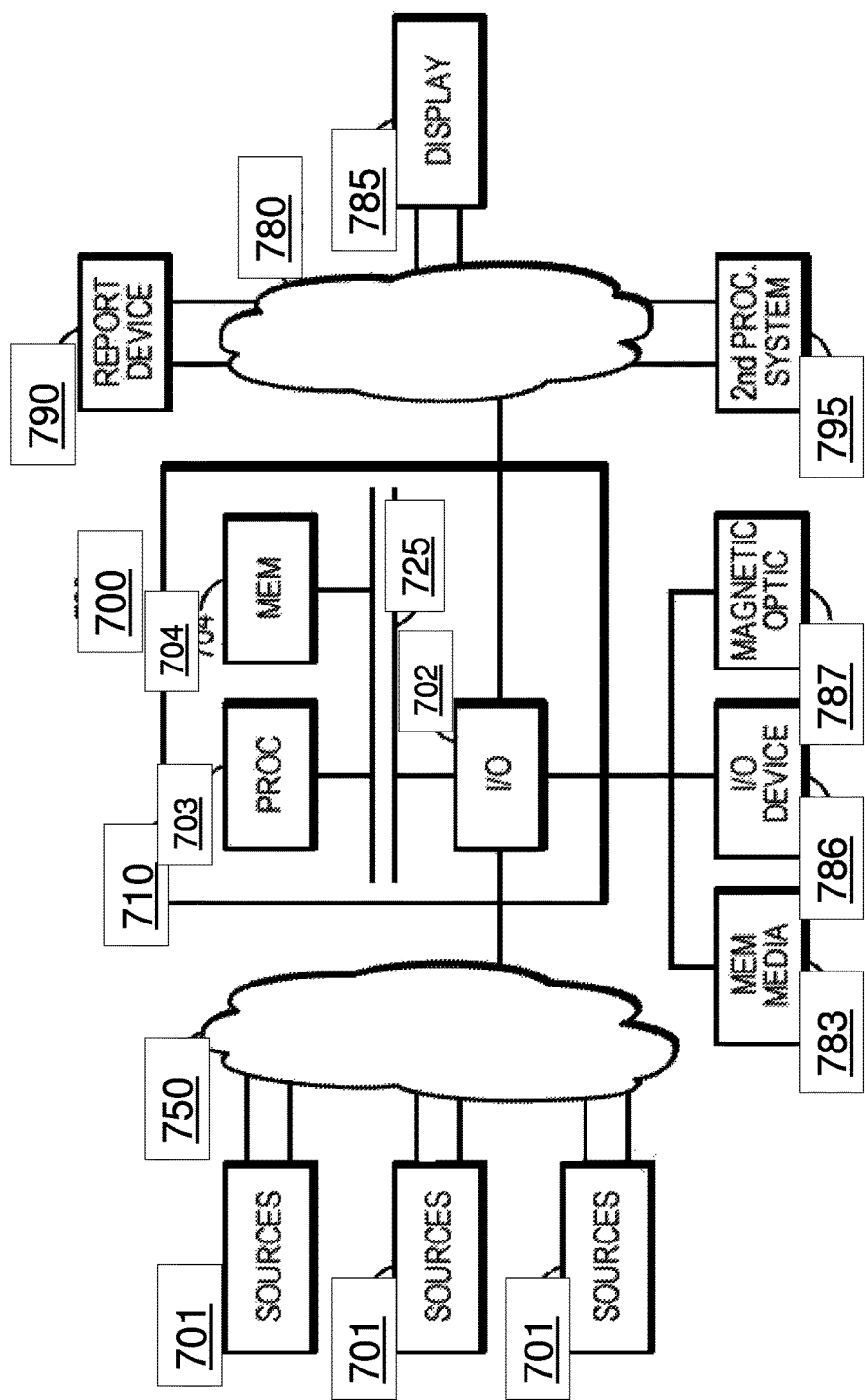
FIG. 7 is an example of an embodiment of an apparatus that may utilize the techniques described herein, in accordance with an embodiment of the present disclosure.
Figure 8:
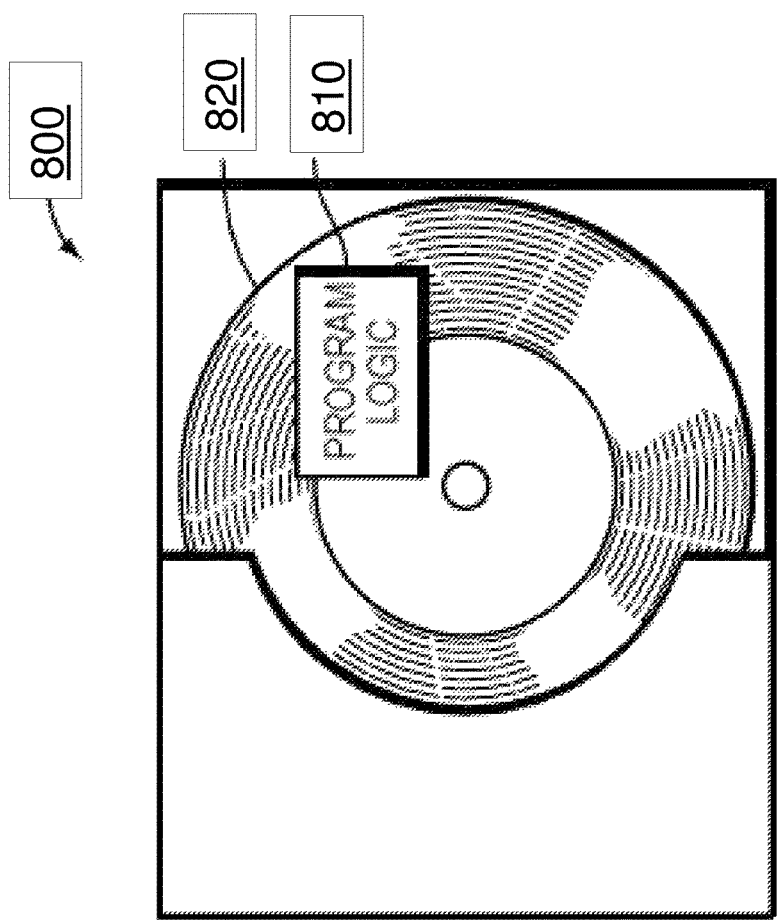
FIG. 8 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as being loaded into memory 1404 and executed by processor 1403 of the computer of FIG. 7, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 8 shows Program Logic 810 embodied on a computer-readable medium 830 as shown, and wherein the Logic is encoded in computer-executable code configured for carrying out the reservation service process of this invention and thereby forming a Computer Program Product 800.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system comprising:
    a first site, the first site comprising an application, a first set of LUNs, and a processor; wherein at least a portion of the first set of LUNs is used by the application;
    a second site comprising a second set of LUNs and a second processor; wherein the first site is replicated to the second site; and
    computer-executable logic operating in memory, wherein the computer-executable logic is configured for execution of:
    determining what LUNs of the first set of LUNs are used by the application;
    creating a copy of the LUNs of the first set of LUNs used by the application;
    determining what LUNs of the second set of LUNS are used for replication of the determined LUNs of the first set of LUNs;
    detecting whether a replication link between a first set of LUNs and a second set of LUNs is in a first state or a second state, the first state being one in which replication is set to occur automatically and the second state being one in which replication is set to occur manually, wherein replication occurring manually is when data is not replicated from the first site to the second site without administrative input;
    in response to detecting that the replication link is in the first state, causing the replication link to exit the first state and enter the second state;
    pausing the application by putting the application in a consistent state by quiescing the application;
    creating a snapshot, on the first site, of the copy of the LUNs of the first set of LUNs used by the application;
    unquiescing the application;
    issuing a manual update to replicate a portion of the snapshot that corresponds to a portion of the copy of the LUNs of the first set of LUNs used by the application to the second site;
    upon completion of the manual update, taking a snapshot of the second set of LUNs on the second site, wherein the snapshot of the second set of LUNs on the second site comprises an application consistent snapshot of the copy of the LUNs of the first set of LUNs used by the application when the application was quiesced, and
    after the snapshot of the second set of LUNs is taken, returning the replication link to the first state in which the replication is set to occur automatically.

2. The system of claim 1 wherein pausing the application is done using a VSS tool.

3. The system of claim 1 wherein the replication link is transitioned from the first state to the second state and transitioned back from the second state to the first state when the replication link is in the first state before the snapshot of the second set of LUNs is taken.

4. The system of claim 3 wherein the application is running on a virtual machine.

5. The system of claim 4 wherein the computer-executable logic is further configured for the execution of:
verifying that the application responds to a pause command.

6. The system of claim 5 wherein computer executable logic is further configured for the execution of:
performing a connectivity check on the replication link.

7. A computer program product for providing a back-up application agnostic back-up during asynchronous data replication comprising:
a non-transitory computer readable medium encoded with computer executable program code, the code configured to enable the execution of:
determining what LUNs of a first set of LUNs are used by an application on a first site;
creating a copy of the LUNs of the first set of LUNs used by the application;
determining what LUNs of a second set of LUNS are used for replication of the determined LUNs of the first set of LUNs on a second site;
detecting whether a replication link between the first set of LUNs and the second set of LUNs is in a first state or a second state, the first state being one in which replication is set to occur automatically and the second state being one in which replication is set to occur manually, wherein replication occurring manually is when data is not replicated from the first site to the second site without administrative input;
in response to detecting that the replication link is in the first state, causing the replication link to exit the first state and enter the second state;
pausing the application by putting the application in a consistent state by quiescing the application;
creating a snapshot, on the first site, of the copy of the LUNs of the first set of LUNs used by the application; and
un-quiescing the application;
issuing a manual update to replicate a portion of the snapshot that corresponds to a portion of the copy of the LUNs of the first set of LUNs used by the application to the second site;
upon completion of the manual update, taking a snapshot of the second set of LUNs on the second site, wherein the snapshot of the second set of LUNs on the second site comprises an application consistent snapshot of the copy of the LUNs of the first set of LUNs used by the application when the application was quiesced; and
after the snapshot of the second set of LUNs is taken, returning the replication link to the first state in which the replication is set to occur automatically.

8. The computer program product of claim 7 wherein pausing the application is done using a VSS tool.

9. The computer program product of claim 7 wherein the replication link is transitioned from the first state to the second state and transitioned back from the second state to the first state when the replication link is in the first state before the snapshot of the second set of LUNs is taken.

10. The computer program product of claim 9 wherein the application is running on a virtual machine.

11. The computer program product of claim 10 wherein the code is further configured to enable the execution of:
verifying that the application responds to a pause command.

12. The computer program product of claim 11 wherein computer executable logic is further configured for the execution of:
performing a connectivity check on the replication link.

13. A computer implemented method for providing a back-up application agnostic back-up during asynchronous data replication, the method comprising:
determining what LUNs of a first set of LUNs are used by an application on a first site;
creating a copy of the LUNs of the first set of LUNs used by the application;
determining what LUNs of a second set of LUNS are used for replication of the determined LUNs of the first set of LUNs on a second site;
detecting whether a replication link between the first set of LUNs and the second set of LUNs is in a first state or a second state, the first state being one in which replication is set to occur automatically and the second state being one in which replication is set to occur manually, wherein replication occurring manually is when data is not replicated from the first site to the second site without administrative input;
in response to detecting that the replication link is in the first state, causing the replication link to exit the first state and enter the second state;
pausing the application by putting the application in a consistent state by quiescing the application;
creating a snapshot, on the first site, of the copy of the LUNs of the first set of LUNs used by the application; and
issuing a manual update to replicate a portion of the snapshot that corresponds to a portion of the determined LUNs of the first set of LUNs used by the application to the second site;
upon completion of the manual update, taking a snapshot of the second set of LUNs on the second site, wherein the snapshot of the second set of LUNs on the second site comprises an application consistent snapshot of the copy of the LUNs of the first set of LUNs used by the application when the application was quiesced; and
after the snapshot of the second set of LUNs is taken, returning the replication link to the first state in which the replication is set to occur automatically.

14. The method of claim 13 wherein pausing the application is done using a VSS tool.

15. The method of claim 13 wherein the replication link is transitioned from the first state to the second state and transitioned back from the second state to the first state when the replication link is in the first state before the snapshot of the second set of LUNs is taken.

16. The method of claim 15 wherein the application is running on a virtual machine.

17. The method of claim 16 further comprising verifying that the application responds to a pause command.

18. The method of claim 17 further comprising performing a connectivity check on the replication link.

* * * * *